US010875573B2

(12) United States Patent
Sanvicente Herrera et al.

(10) Patent No.: US 10,875,573 B2
(45) Date of Patent: Dec. 29, 2020

(54) VEHICLE-TRAILER BACKING SYSTEM WITH AUTOMATIC TRAILER RECOGNITION AND STORAGE

(71) Applicant: Continental Automotive Systems, Inc., Auburn Hills, MI (US)

(72) Inventors: Berenice Sanvicente Herrera, Tlajomulco de Zuniga (MX); Francisco Fuentes, Tonalá (MX); Brandon Herzog, Waterford, MI (US); Daniel Diessner, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 243 days.

(21) Appl. No.: 16/110,842

(22) Filed: Aug. 23, 2018

(65) Prior Publication Data
US 2019/0061815 A1 Feb. 28, 2019

Related U.S. Application Data

(60) Provisional application No. 62/548,998, filed on Aug. 23, 2017.

(51) Int. Cl.
*B62D 13/06* (2006.01)
*B62D 53/08* (2006.01)
*B62D 15/02* (2006.01)
*B62D 6/00* (2006.01)

(52) U.S. Cl.
CPC ............. *B62D 13/06* (2013.01); *B62D 6/003* (2013.01); *B62D 15/025* (2013.01); *B62D 53/0871* (2013.01)

(58) Field of Classification Search
CPC ...... B62D 13/06; B62D 6/003; B62D 15/025; B62D 53/0871
USPC .......................................................... 701/301
See application file for complete search history.

(56) References Cited

U.S. PATENT DOCUMENTS

| 2014/0172232 | A1* | 6/2014 | Rupp | B62D 13/06 701/36 |
| 2014/0188344 | A1* | 7/2014 | Lavoie | B62D 15/028 701/41 |
| 2014/0267688 | A1* | 9/2014 | Aich | B60W 50/0097 348/113 |
| 2014/0277942 | A1* | 9/2014 | Kyrtsos | B60W 10/20 701/41 |

* cited by examiner

*Primary Examiner* — Gertrude Arthur Jeanglaude

(57) ABSTRACT

A method of controlling a backing system for a vehicle and trailer assembly includes: initiating a backing system mode; recording at least one image of a trailer for the vehicle and trailer assembly with a camera mounted to the vehicle; identifying a current plurality of features of the trailer in the image; learning a current plurality of distances associated with the current plurality of features. Then comparing the current plurality of features and distances with stored plurality of features of distances to determine if there is a match. If there is not a match a current calibration of a plurality of relative distances associated with the plurality of reference features is learned while the driver performs a number of preset calibration maneuvers. A relative position between the vehicle and the trailer is determined using the stored calibration and the current plurality of features and current plurality of relative distance.

12 Claims, 4 Drawing Sheets

US 10,875,573 B2

VEHICLE-TRAILER BACKING SYSTEM WITH AUTOMATIC TRAILER RECOGNITION AND STORAGE

TECHNICAL FIELD

The present disclosure relates to automotive vehicles and more particularly to advance driver assistance systems for automotive vehicles.

BACKGROUND

A trailer is typically connected to a towing vehicle through a trailer hitch. The trailer hitch allows the trailer to swivel around the hitch horizontally so that the vehicle-trailer unit is able to move around corners. This, however, can pose difficulties when the vehicle is traveling in the reverse. When the vehicle backs up, it pushes the trailer. In certain situations, it is important that the trailer moves straight ahead or along an intended path. Drivers are often confused as to which way to turn the vehicle steering wheel to get the desired change of direction of the trailer. Applying an incorrect steering angle in the vehicle may also cause the trailer to jack-knife and lose its course.

Therefore, backing of trailers attached to vehicles often requires multiple persons to effectively control the vehicle and direct the path the vehicle and trailer are required to travel. Additionally, those unaccustomed to operating vehicle and trailer systems may have some difficulty in accurately controlling the path of the trailer while backing the vehicle and trailer.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

One general aspect includes a method of controlling a backing system for a vehicle and trailer assembly including: initiating a backing system mode with an electronic control unit for a backing system when a start system input. The method of controlling also includes recording at least one image of a hitch for the vehicle and trailer assembly with a camera mounted to the vehicle. The method of controlling also includes identifying a current plurality of features of the trailer in the image. The method of controlling also includes learning with the electronic control unit a current plurality of distances associated with the current plurality of features. The method of controlling also includes comparing the current plurality of features and current plurality of distances with stored plurality of features and a stored plurality of distances to determined when there is a match. The method of controlling also includes determining a relative position between the vehicle and the trailer using a stored calibration and the currently plurality of features and current plurality of relative distance to when there is a match. The method of controlling also includes learning a current calibration of a plurality of relative distances associated with the plurality of reference features while the driver performs a number of preset calibration maneuvers when there is not a match; storing the current plurality of reference features and the current plurality of relative distances in the electronic control unit as a stored calibration, and determining a relative position between the vehicle and the trailer using the stored calibration and the currently plurality of features and the current plurality of relative distance. Other embodiments of this aspect include corresponding computer systems, apparatus, and computer programs recorded on one or more computer storage devices, each configured to perform the actions of the methods.

One general aspect includes a method of controlling a backing system for a vehicle and trailer assembly including: initiating a backing system mode with an electronic control unit for a backing system when a start system input. The method of controlling also includes recording at least one image of a hitch for the vehicle and trailer assembly with a camera mounted to the vehicle. The method of controlling also includes identifying a current plurality of features of the trailer in the image; learning with the electronic control unit a current plurality of distances associated with the current plurality of features, comparing the current plurality of features and current plurality of distances with stored plurality of features and a stored plurality of distances to determined when there is a match, learning a current calibration of a plurality of relative distances associated with the plurality of reference features while the driver performs a number of preset calibration maneuvers when there is not a match. The method of controlling also includes initiating a learning mode for the electronic control unit of the backing system. The method of controlling also includes moving the vehicle and trailer assembly in at least one of a forward and backward direction while in the learning mode. The method of controlling also includes recording the plurality of distances between the plurality of reference features occurring during the moving the vehicle and trailer assembly; and calculating from the plurality of distances a relative position between the vehicle and the trailer. The method of controlling also includes storing the current plurality of reference features and the current plurality of relative distances in the electronic control unit as a stored calibration. The method of controlling also includes determining a relative position between the vehicle and the trailer using the stored calibration and the currently plurality of features and the current plurality of relative distance. Other embodiments of this aspect include corresponding computer systems, apparatus, and computer programs recorded on one or more computer storage devices, each configured to perform the actions of the methods.

One general aspect includes a method of controlling a backing system for a vehicle and trailer assembly including: initiating a backing system mode with an electronic control unit for a backing system when a start system input. The method of controlling also includes recording at least one image of a hitch for the vehicle and trailer assembly with a camera mounted to the vehicle. The method of controlling also includes identifying a current plurality of features of the trailer in the image. The method of controlling also includes learning with the electronic control unit a current plurality of distances associated with the current plurality of features. The method of controlling also includes comparing the current plurality of features and current plurality of distances with stored plurality of features and a stored plurality of distances to determine there is a match. The method of controlling also includes determining a relative position between the vehicle and the trailer using a stored calibration and the current plurality of features and current plurality of relative distance.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
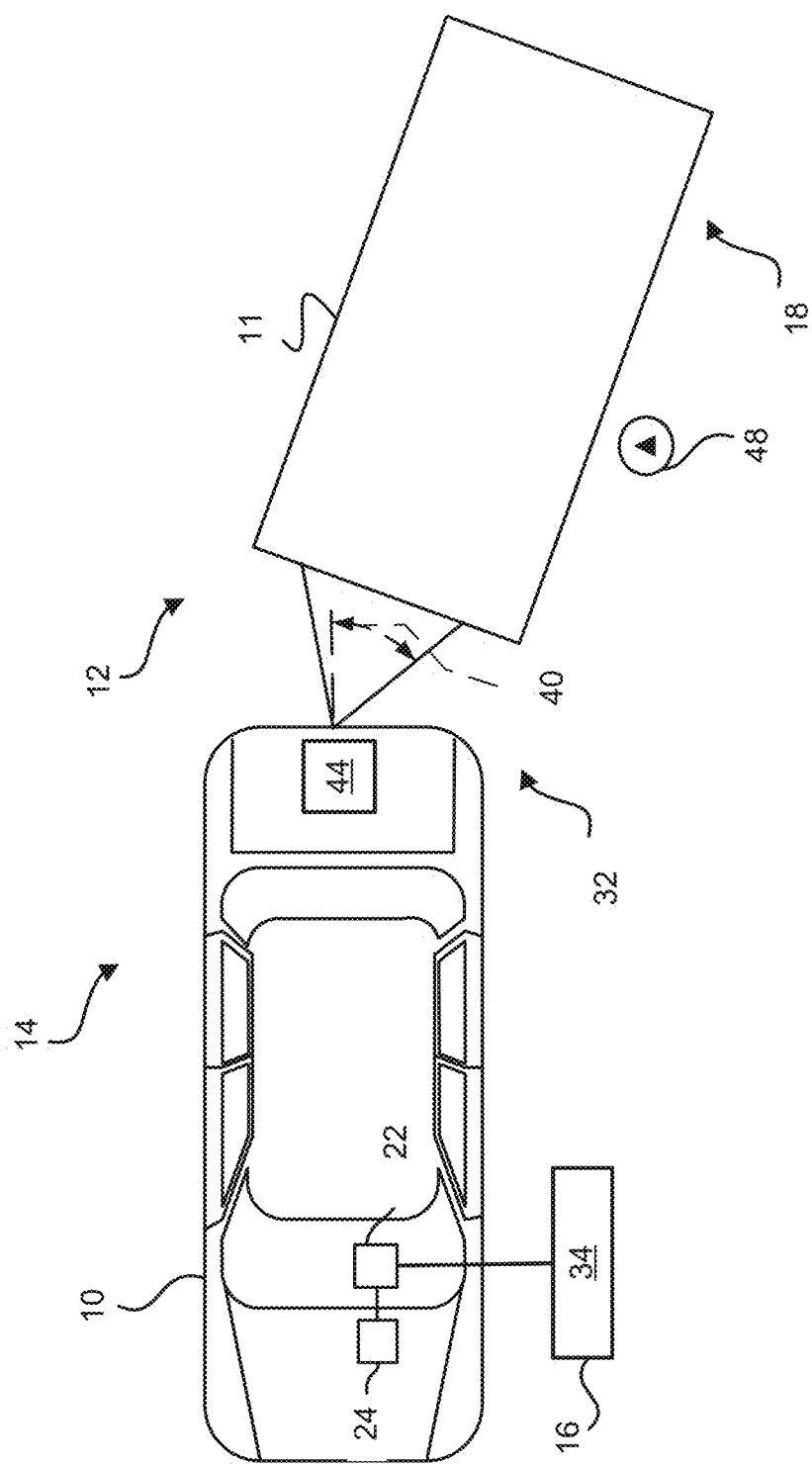
FIG. 1 is a schematic diagram of a vehicle and trailer assembly having a trailer backing system of the present invention.

The following description is merely exemplary in nature and is in no way intended to limit the disclosure, its application, or uses. For purposes of clarity, the same reference numbers will be used in the drawings to identify similar elements. FIG. 1 illustrates a vehicle 10 and a trailer 11 (not shown in FIGS. 2-3). The vehicle 10 may be a car, truck, tractor, etc. The trailer 11 is controllably secured to the vehicle 10 to form a vehicle and trailer assembly 12. The vehicle and trailer assembly 12 utilizes a trailer backing system 14 of the present invention. Throughout the application the relative directions of forward and rear are used in the traditional manner. That is, in reference to the direction which an operator for the vehicle 10 would typically be facing when driving the vehicle 10. Therefore, in operation of the trailer backing system 14 the vehicle 10 would be in a reverse gear and the vehicle and trailer assembly 12 are moving backward. During use of the backing system 14, the operator of the backing system 14 may also be facing "backward" in the same direction the vehicle-trailer assembly 12 is moving.

Figure 2:
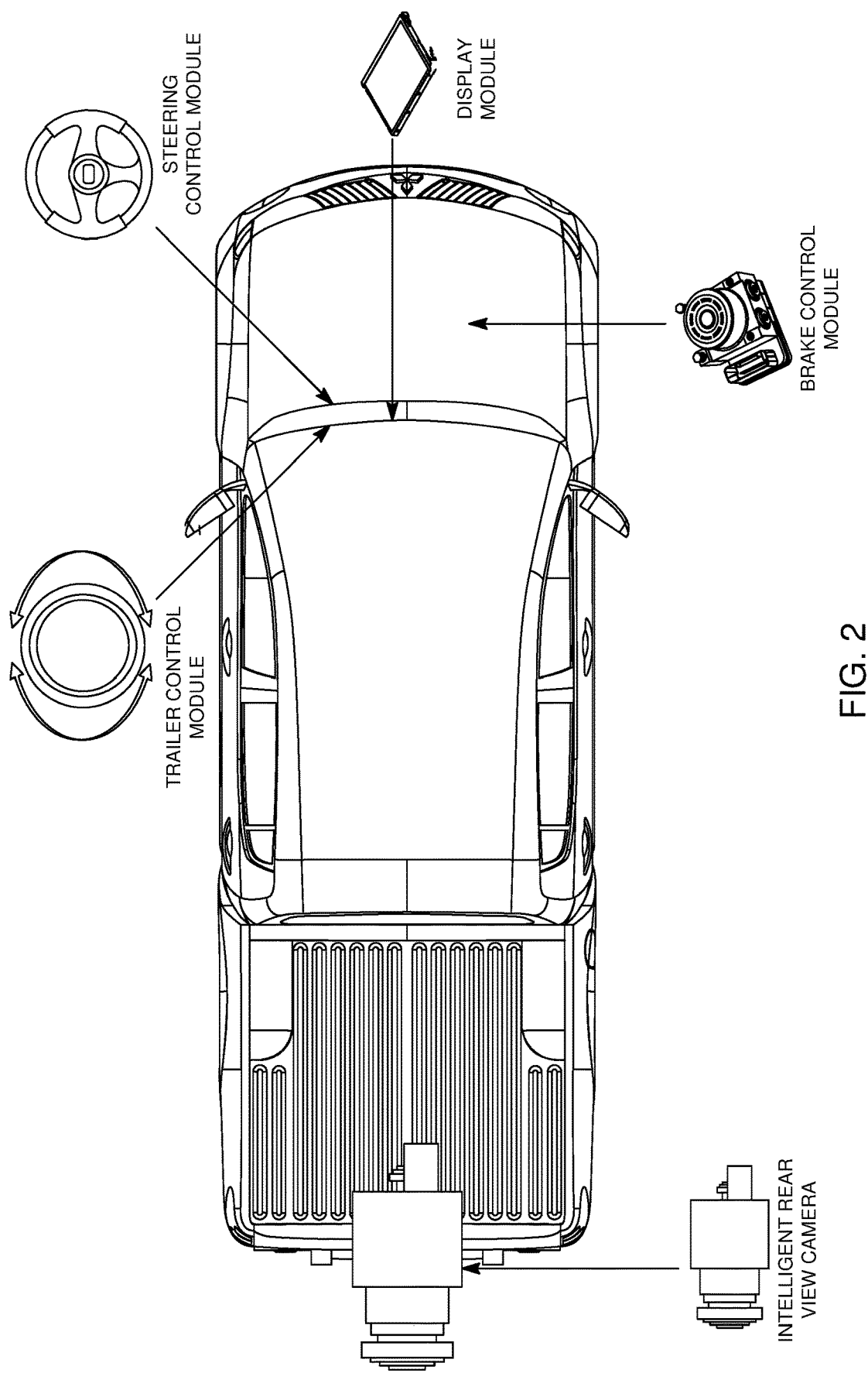
FIG. 2 is a first embodiment of the backing system on a vehicle.

Referring to FIGS. 1-2, a first embodiment for utilizing the trailer backing system 14 is described. A control device 16 is connected to allow a user to input instructions to an electronic control unit (ECU) 22 for the trailer backing system 14. The control device 16 acts as a human machine interface (HMI) between the operator and the backing system 14 and may include multiple components, such as an input device 16a and a display 16b. The input device 16a may be incorporated into the vehicle as a separate control from the steering wheel, e.g. shown here as a knob style control. Further inputs into the system may be entered through the HMI devices for the vehicle.

The ECU 22 may be connected to various vehicle systems 24 such as a powertrain system 24a, a steering system 24b, a brake system 24c, etc. to control and direct movement of the vehicle and trailer assembly 12. The ECU 22 sends instructions to the vehicle systems 24 to move the vehicle and trailer assembly 12 along a desired backing path to a final location based upon user inputs.

The ECU 22 receives a variety of inputs from the control device 16 to control the vehicle and trailer assembly 12 with the backing system 14. The ECU 22 interprets the various inputs, and determines the desired vehicle action that the input 26 is requesting. Based upon a current status of the vehicle and trailer assembly 12, and the desired vehicle action the ECU 22 determines a required vehicle response needed to achieve the desired vehicle action, and sends the appropriate signal(s) to instruct the various vehicle systems 24 to perform the calculated vehicle response. The backing system 14 can incorporate the variety of input requests to provide complete user control of the vehicle and trailer assembly 12 from outside the vehicle 10. In particular, the backing system 14 uses a relative position 40, e.g. a hitch angle, between the vehicle 10 and the trailer 11 to determine the correction vehicle-trailer position and to determine the vehicle response needed to achieve the desired vehicle action, i.e. the change in hitch angle that is needed.

The backing system 14 may use camera(s) 44 on the vehicle 10 to provide a rear view of the vehicle 10, camera 44 viewing angle show in phantom. The camera 44 is preferably a camera which is already installed in the vehicle 10, such as a back-up camera or a surround view camera. The camera 44 captures an image and image analysis by the ECU 22 is used to calculate the measured relative position 40. The measured relative position 40 is used by the ECU 22 to determine a desired steering angle based on the requested relative position, e.g. hitch angle. The current relative position 40 may also be displayed on the device 16 as well for user information.

The ECU 22 can use image analysis to pick out a plurality of reference features 45, e.g. corners of the trailer 11, decal or symbols on the trailer 11 or trailer hitch, etc. The ECU 22 may then also learn a plurality of relative distances 47 between these features to calculate the trailer geometry and store the reference features 45 in memory accessible by the ECU 22 as a specific trailer 11.

In addition, to the plurality of relative distances 47 of reference features 45 the backing system 14 will also need to know a plurality of relative distances 47 which are associated with the geometry of the trailer 11. The backing system 14 can learn some trailer geometry in the learning mode. Knowing the relative distances 47 of the reference features 45 and knowing the trailer geometry the ECU 22 can calculate the relative position 40, e.g. hitch angle, between the vehicle and/or tractor 10 and trailer 11 and track in changes in the relative position 40 in real time. The ECU 22 must know the vehicle 10 and trailer 11 geometry including the vehicle wheelbase (by), the distance from the rear axle to the hitch point on the vehicle h, the length of the trailer (c), hitch point to first axle on trailer (a), the height from the ground to the hitch point (g) and some of the geometry of the front of the trailer, i.e. these are some of the plurality of reference features 45 and relative distances 47.

Further extension is possible to self-learn the trailer 11 geometry and length based on prior movements of the trailer 11 in forward (or possible backwards 13) motion. Each trailer 11 has a certain way of control largely depending on the length of the trailer 11. Monitoring the movement of the trailer 11 while the vehicle-trailer assembly 12 is in motion makes it possible to self-learn the trailer 11 geometry and begin tracking the trailer relative position 40 in real time It is important to note that self-learning requires input of the vehicle dynamics and video(s) feed. Trailer length can also be determined with blind spot radars/lidars. These distances may be learned by the driver performing several preset maneuvers with the vehicle-trailer unit. The ECU 22 takes measurements during the calibration maneuvers and therefore the necessary trailer geometry is calculated and stored in the ECU 22 for the backing system 14.

Figure 3:
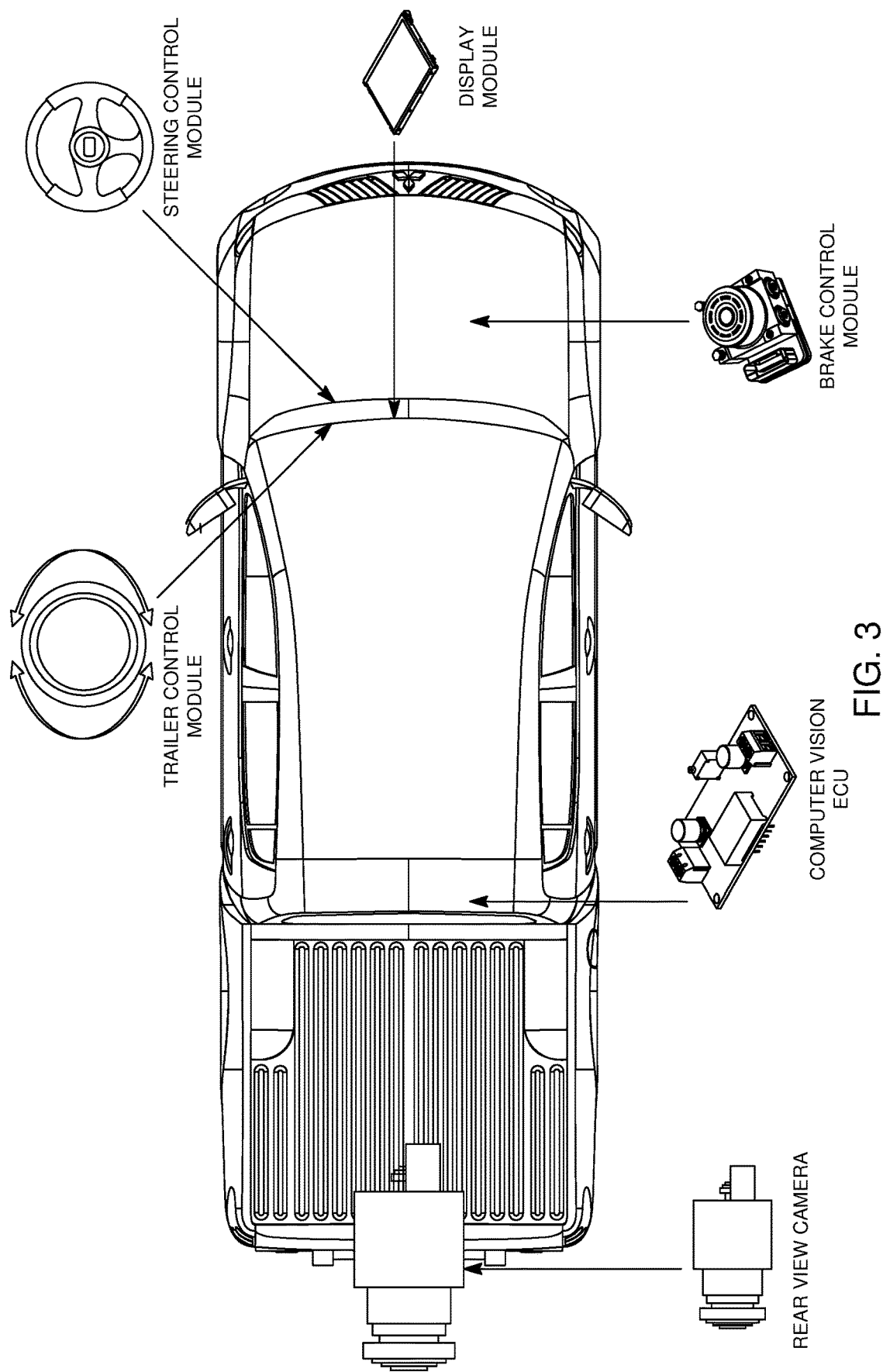
FIG. 3 is a second embodiment of the backing system on a vehicle

Once a trailer calibration has been performed the backing system 14 will remember the trailer 11 and the calibration maneuvers may not need to be performed again. The driver may simply select the trailer from the stored memory using the vehicle HMI. For example as shown in FIGS. 2 and 3, the driver may use the infotainment/navigation system inputs and display or other input available on the instrument cluster for the vehicle 10. Additionally, the input/knob module may have various other inputs available, e.g. buttons, push down on knob, etc. or be able to control a selector for the HMI when not being used to input the desired steering angle during the reversing process.

Alternatively, the ECU 22 may automatically recognize a previously stored trailer by comparing the plurality of current reference features 45 and the plurality of current relative distances 47 in a current image, with the plurality of stored reference features 45 and the plurality of stored relative distances 47. The plurality of current reference features 45 and the plurality of current relative distances 47 which can be viewed by the camera 44 will change as the vehicle and trailer assembly 12 are moving and the relative position between the vehicle 10 and trailer 11 changes. Therefore, the number of stored reference features and the stored relative distances in stored calibration may be greater than the number of current reference features 45 and current relative distances 47 being viewed by the camera.

Additionally, for a new trailer the initial current reference features 45 and the plurality of current relative distances 47 will be limited to what can be initially seen. Once in learning mode additional current reference features 45 and the plurality of current relative distances 47 of a new trailer 11 will come in to view as the relative position between the vehicle 10 and the trailer 11 are calculated in real time. Also, some of the trailer geometry information will be determined during the learning mode. Therefore, the number current reference features 45 and current relative distances 47 of a new trailer will be less than what is determined in learning mode which becomes part of the stored calibration. The stored calibration is recorded in storage accessible by the ECU 22 and the trailer 11 will now be a stored trailer 11.

Once maximum trailers are stored and a new one is detected then the trailer not used in the longest amount of time gets deleted and the new one replaces. This may be automatic or the driver may be able to confirm the suggestion to delete the trailer entry that has not been used in the longest amount of time. Alternatively, the driver may be given the option of which trailer to delete.

The driver may be able to visualize and/or customize the list with names is desired. However, no user interaction is required to learn the trailer 11, unless the calibration maneuvers were not performed prior to trying to use the backing system 14.

Referring to FIG. 3, at least one camera 16 may be an intelligent camera 16, in that an ECU 22 is incorporated in the housing with the camera 16.

Figure 4:
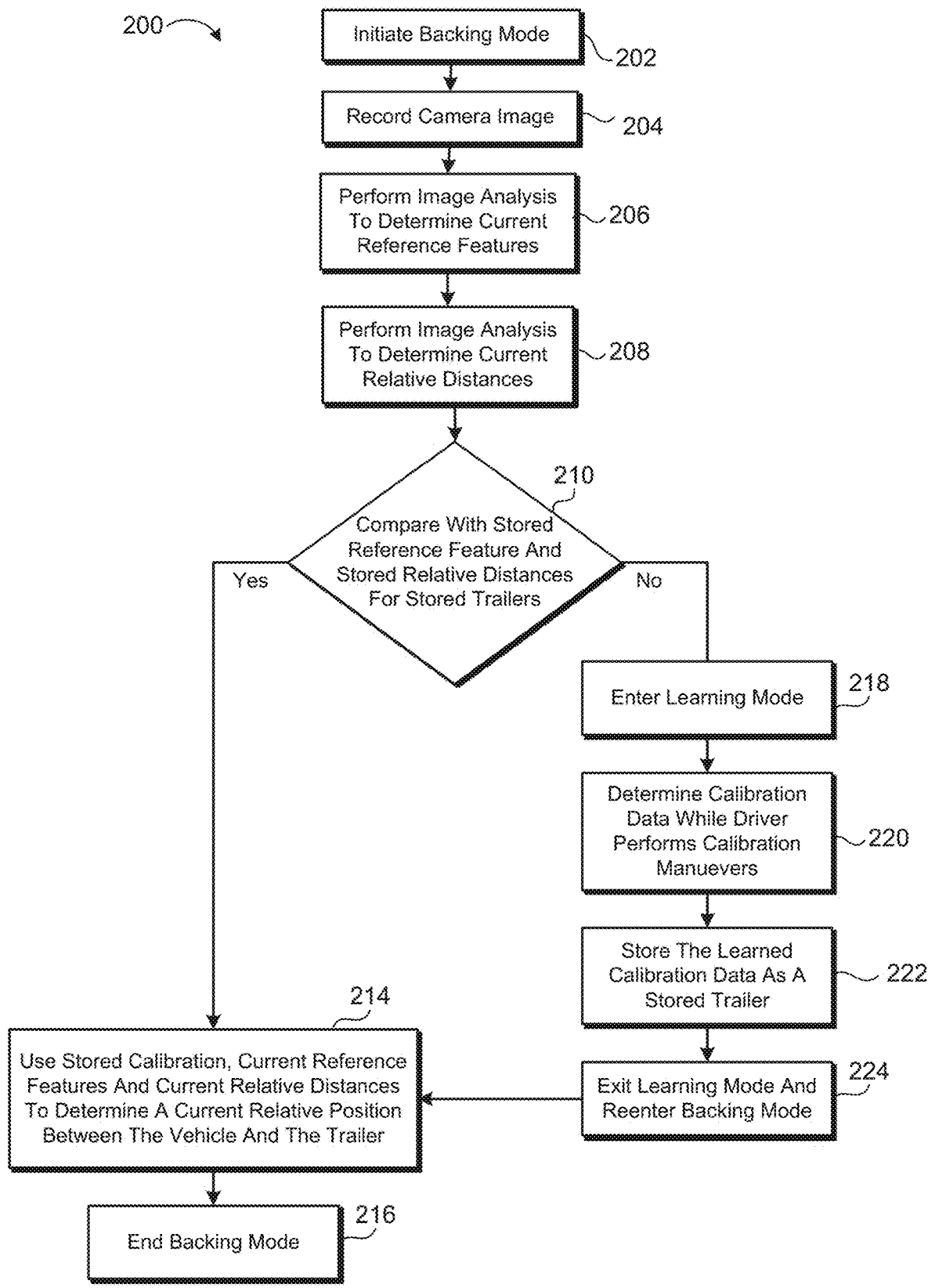
FIG. 4 is an embodiment of a method for using the backing system.

Referring to FIG. 4 a method of controlling a backing system for a vehicle and trailer assembly is illustrated at 200. The method begins by initiating a backing system mode with the ECU for a backing system when a start system input is received, shown at 202. The input could be user activation of the backing system 14 through the control device 16, or other HMI available on the vehicle 10. Alternatively, the system could be automatically started when present conditions are met, e.g. vehicle is shifted into reverse when a trailer is attached. Recognition of trailer attachment could come from the ECU 22 or another system, e.g. brake system sends a signal when trailer brakes are attached.

THE ECU 22 receives at least one image from at least one vehicle camera 44 mounted to the vehicle. This image is recorded by the ECU 22 and image includes of a hitch and other current reference features 45 for the vehicle and trailer assembly 12, shown at 204. The ECU 22 performs image analysis to identify a plurality of current reference features 45 of the trailer in the image, shown at 206. The ECU 22 learns a plurality of relative distances associated with the plurality of reference features 45, shown at 208. The ECU 22 then compares those distance with stored reference features 45 and a plurality of current relative distances 47, shown at 210. If the ECU 22 finds a match with a trailer 11 previously stored the ECU 22 may use the previously stored calibration for that trailer 11.

A current trailer 11 may be considered matched with a stored trailer 11 when a predetermined number of current reference features 45 and current relative distances 47 are the same as the stored reference features and stored relative distances. If the current trailer 11 matches with a stored trailer 11 then a relative position 40 between the vehicle and the trailer assembly 12 is determined using the stored calibration, the current plurality of reference features, and the relative distances 47, shown at 216. Backing mode is ended when the maneuvers are complete, e.g. driver shifts out of reverse, shown at 216.

If there is not a stored trailer 11 with matching information the backing system 14 enters a learning mode, shown at 218, and ECU 22 learns the relative distances while the driver performs a number of preset calibration maneuvers, shown at 220. The plurality of current reference features 45 and current relative distances 47 are stored in memory accessible to the ECU 22 as a stored calibration, shown at 222.

Alternatively, the stored calibration may be updated by performing the preset calibration maneuvers again and storing the updated current reference features 45 and current relative distances 47 to replace the previously stored reference features and relative distances. This may be done for example, automatically when a stored calibration has been stored for predetermined length of time, e.g. annually, at user request, or when a something in the reference features 45 and relative distances has changed, e.g. decal added or removed. After storing the calibration, the backing system 14 returns to backing mode, shown at 224. The newly stored trailer is set as matched to the current trailer 11 within the system.

A relative position 40 between the vehicle and the trailer assembly 12 is determined using the stored calibration, the current plurality of reference features, and the relative distances 47, shown at 216. Backing mode is ended when the maneuvers are complete, e.g. driver shifts out of reverse, shown at 216.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of controlling a backing system for a vehicle and a trailer assembly, the method comprising:

initiating a backing system mode with an electronic control unit for a backing system when a start system activation input is received;

recording at least one image of a hitch for the vehicle and trailer assembly with a camera mounted to the vehicle;

identifying a current plurality of reference features of the trailer in the image;

learning with the electronic control unit a calibration which includes a current plurality of distances associated with the current plurality of reference features;

comparing the current plurality of reference features and the current plurality of distances with a stored plurality of features and a stored plurality of distances to determined when there is a match;

determining a relative position between the vehicle and the trailer using a stored calibration and the current plurality of reference features and the current plurality of distances to when there is a match; and learning a current calibration of a plurality of relative distances associated with the current plurality of reference features while a driver performs a number of preset calibration maneuvers when there is not a match;
storing the current plurality of reference features and the current plurality of relative distances in the electronic control unit as a stored calibration; and
determining a relative position between the vehicle and the trailer using the stored calibration and the current plurality of features and the current plurality of relative distance.

2. The method of claim 1, wherein the camera is one of a rear facing back up camera and an intelligent rear facing back up camera.

3. The method of claim 1, wherein the electronic control unit for the backing system is separate from the electronic control unit for the camera.

4. The method of claim 1, wherein the learning the calibration further comprises:
initiating a learning mode for the electronic control unit of the backing system;
moving the vehicle and trailer assembly in at least one of a forward and backward direction while in the learning mode;
recording the plurality of distances between the current plurality of reference features occurring during the moving the vehicle and trailer assembly; and
calculating from the plurality of relative distances a relative position between the vehicle and the trailer.

5. The method of claim 1, wherein the relative position between the vehicle and the trailer is calculated in real time with inputs received by the electronic control unit and the camera.

6. The method of claim 1, wherein a control device has a display screen configured to be a human machine interface capable of receiving input requests from a user.

7. A method of controlling a backing system for a vehicle and a trailer assembly, the method comprising:
initiating a backing system mode with an electronic control unit for a backing system when a start system activation input is received;
recording at least one image of a hitch for the vehicle and trailer assembly with a camera mounted to the vehicle;
identifying a current plurality of reference features of the trailer in the image;
learning with the electronic control unit a current plurality of distances associated with the current plurality of reference features;
comparing the current plurality of reference features and the current plurality of distances with stored plurality of reference features and a stored plurality of distances to determined when there is a match;
learning a current calibration of a plurality of relative distances associated with the current plurality of reference features while a driver performs a number of preset calibration maneuvers when there is not a match;
initiating a learning mode for the electronic control unit of the backing system;
moving the vehicle and trailer assembly in at least one of a forward and backward direction while in the learning mode;
recording the plurality of distances between the current plurality of reference features occurring while moving the vehicle and trailer assembly;
calculating from the plurality of relative distances a relative position between the vehicle and the trailer;
storing the current plurality of reference features and the current plurality of relative distances in the electronic control unit as a stored calibration; and
determining a relative position between the vehicle and the trailer using the stored calibration and the current plurality of reference features and the current plurality of relative distances.

8. The method of claim 7, wherein the camera is one of a rear facing back up camera and an intelligent rear facing back up camera.

9. The method of claim 7, wherein the electronic control unit for the backing system is separate from the electronic control unit for the camera.

10. The method of claim 7, wherein the relative position between the vehicle and the trailer is calculated in real time with inputs received by the electronic control unit and the camera.

11. The method of claim 7, wherein a control device has a display screen configured to be a human machine interface capable of receiving input requests from a user.

12. A method of controlling a backing system for a vehicle and trailer assembly, the method comprising:
initiating a backing system mode with an electronic control unit for a backing system when a start system activation input is received;
recording at least one image of a hitch for the vehicle and trailer assembly with a camera mounted to the vehicle;
identifying a current plurality of reference features of the trailer in the image;
learning with the electronic control unit a current plurality of distances associated with the current plurality of reference features;
comparing the current plurality of reference features and the current plurality of distances with stored plurality of features and a stored plurality of distances to determine there is a match; and
determining a relative position between the vehicle and the trailer using a stored calibration and the current plurality of reference features and current plurality of relative distance.

* * * * *